(12) United States Patent
Højfeldt (10) Patent No.: US 11,096,499 B1
(45) Date of Patent: Aug. 24, 2021

(54) SINGLE-MOVEMENT POSITION CHANGE APPARATUS AND METHOD

(71) Applicant: INNOVATION U.S.A., INC., Irvine, CA (US)

(72) Inventor: Emil Højfeldt, Randers (DK)

(73) Assignee: INNOVATION U.S.A., INC., Irvine, CA (US)

( * ) Notice: Subject to any disclaimer, the term of this patent is extended or adjusted under 35 U.S.C. 154(b) by 319 days.

(21) Appl. No.: 16/146,120

(22) Filed: Sep. 28, 2018

(51) Int. Cl.
*A47C 17/13* (2006.01)
*F16H 21/44* (2006.01)

(52) U.S. Cl.
CPC ............ *A47C 17/13* (2013.01); *F16H 21/44* (2013.01)

(58) Field of Classification Search
CPC ..... A47C 17/13; A47C 17/132; A47C 17/134; A47C 17/136; A47C 17/138; A47C 17/04; A47C 17/045; A47C 17/12; F16H 21/44
See application file for complete search history.

(56) References Cited

U.S. PATENT DOCUMENTS

| | | | | |
|---|---|---|---|---|
| 3,727,245 A | * | 4/1973 | Gerth | A47C 17/32 5/14 |
| 3,771,178 A | * | 11/1973 | Inman | A47C 17/134 5/13 |
| 4,860,393 A | * | 8/1989 | Schefthaler | A47C 17/134 5/21 |
| 5,913,571 A | * | 6/1999 | Dystra | A47C 17/22 297/452.12 |
| 5,970,538 A | * | 10/1999 | Walker | A47C 19/14 5/17 |
| 9,609,955 B1 | * | 4/2017 | Rogers | A47C 17/16 |
| 2017/0071352 A1 | * | 3/2017 | Adams | A47C 17/138 |
| 2019/0274438 A1 | * | 9/2019 | Lopez Gil | A47C 17/04 |

FOREIGN PATENT DOCUMENTS

EP 2526833 A1 * 5/2011 ............. A47C 17/13

\* cited by examiner

*Primary Examiner* — Nicholas F Polito
*Assistant Examiner* — George Sun
(74) *Attorney, Agent, or Firm* — Miles & Stockbridge, P.C.

(57) ABSTRACT

A position change apparatus and method for changing a position of a convertible-position item of furniture.

26 Claims, 4 Drawing Sheets

SINGLE-MOVEMENT POSITION CHANGE APPARATUS AND METHOD

FIELD OF THE INVENTION

Embodiments relate generally to a mechanism for changing a reclining position for an item of furniture and methods relating thereto.

BACKGROUND OF THE INVENTION

Various methods and mechanisms have been used for allowing a user to change the position of an item of convertible-position furniture, such as a sleeper sofa, lie-flat recliner, or a pull-out bed futon or couch. However, such prior approaches can be difficult to operate due to the lifting or pulling force required to be exerted by the user in changing the position of the item of furniture from an upright to a lie-flat position, or vice versa.

Thus, it would be advantageous to provide a safer, simpler method and device to allow a user to easily change the position of an item of convertible-position furniture with a single movement.

SUMMARY

Embodiments can comprise a position conversion bracket having a pair of seat mounts and a pair of moveable arms each rotatably connected at an end to one of said seat mounts using a connector, the pair of seat mounts and the pair or moveable arms being arranged to form the position conversion bracket to have a substantially rectangular shape in a highest extended position. The pair of moveable arms are disposed substantially parallel with respect to each other on opposite sides of the position conversion bracket, and the pair of seat mounts are disposed substantially parallel with respect to each other on the other opposite sides of the position conversion bracket, in the highest extended position. The position conversion bracket is constructed such that the moveable arms and the seat mounts can rotatably move in a plane with respect to each other. According to various embodiments, each moveable arm and each seat mount is rotatably connected at respective ends to form the substantially rectangular position conversion bracket.

The position conversion bracket can have a square shape in the highest extended position.

The position conversion bracket can further include a downward-depending support member rotatably connected at one end to an end of a support member via a connector, the support member being connected at another end to an uppermost end of the outermost moveable arm and to an outermost end of the upper seat mount at one corner of the position conversion bracket via one of said connectors. The downward-depending support member can be configured to swing arcuately in a rotation about said connector so as to move between one of a subtantially horizontal position and a substantially vertical position.

According to various embodiments, an outermost one of the pair of moveable arms has an inward bend in a direction of an oppositely-disposed innermost one of the pair moveable arms, and the innermost moveable arm has a corresponding inward bend in a direction of the the oppositely-disposed outermost moveable arm. In some embodiments, a biasing member connects the pair of moveable arms between their inward bends.

Embodiments can further comprise a convertible-position assembly including a plurality of position conversion brackets each connected by a rigid connector support, in which each position conversion bracket includes a pair of seat mounts and a pair of moveable arms each rotatably connected at an end to one of the seat mounts using a connector. The pair of seat mounts and the pair or moveable arms are arranged to form the position conversion bracket to have a substantially rectangular shape in a highest extended position. The pair of moveable arms are disposed substantially parallel with respect to each other on opposite sides of the position conversion bracket, and the pair of seat mounts are disposed substantially parallel with respect to each other on the other opposite sides of the position conversion bracket, in the highest extended position. Furthermore, the position conversion bracket is constructed such that the moveable arms and the seat mounts can rotatably move in a plane with respect to each other.

In various embodiments, the rigid connector support has a length constructed so as to position each said position conversion bracket at opposite sides of an attached seat. The rigid connector support can be fixedly connected at each end to a lower end of an innermost one of the pair of moveable arms, and rotatably connected to an innermost end of a lower one of the seat mounts, at one corner of the position conversion bracket.

In various embodiments, the position conversion assembly is constructed such that, upon application of a pulling force to said attached seat, a distal end of each of said pair of moveable arms moves to define an arcuately-shaped path with respect to a lower one of said pair of seat mounts, so as to effect a single translational movement of an upper one of the pair of seat mounts with respect to the lower seat mount, in which, upon application of the pulling force, the position conversion assembly is constructed to move the attached seat from an upright position to a flat position, and upon application of a pushing force in a direction opposite the pulling force, the position conversion assembly is constructed to move the attached seat from the flat position to the upright position. Each moveable arm can further comprise an inward bend having an angle which is selected to result in a first height of a seat bottom above a floor to be a same height in the upright position and in the flat position. Each moveable arm can be constructed to have a length selected to result in a second height of the seat bottom above the floor to be a different and greater height than the first height in an intermediate, extended position between the upright position and the flat position. Each moveable arm can also be constructed to have a length selected to result in the seat being spaced apart from a back by a distance, d, in the flat position, in which the upper seat mount is attached to the seat at a location which will cause the seat to be adjacent to the back in the upright position, and in which the distance, d, is equal to a same length of an upper portion of the back such that the back can be rotatably moved into an adjacent flat position next to the seat in the flat position.

Furthermore, each of the pair of seat mounts has a length that results in a portion of a weight of the seat effecting a moving force on the seat so as to use gravity to assist with the movement of the seat from the intermediate, extended position to the flat position, and to assist with the movement of the seat back to the upright position from the intermediate, extended position, so as to reduce the pulling and pushing force required to change the position of the seat from the upright position to the flat position, and vice versa.

In the position conversion assembly, each position conversion bracket can further include a downward-depending support member rotatably connected at one end to an end of a support member via a connector, the support member being connected at another end to an upperost end of the outermost moveable arm, and to an outermost end of the upper seat mount at one corner of the position conversion bracket. In various embodiments, the downward-depending support member can be configured to swing arcuately in a rotation about said connector so as to move between one of a subtantially horizontal orientation in the upright position and a substantially vertical orientation in the flat position. The downward-depending support member can be balanced or weighted so as to move into a generally or substantially vertical position for supporting the weight of the seat in the flat position.

Embodiments can further comprise a position change method including: providing at least two position conversion brackets mounted at opposite sides of a seat of a convertible-position furniture item; applying a pulling force to the seat to change a position of the seat from an upright position to a flat position; and applying a pushing force in a direction opposite the pulling force to change a position of the attached seat from the flat position to the upright position. In such embodiments, each position conversion bracket can include a pair of seat mounts and a pair of moveable arms each rotatably connected at an end to one of the seat mounts using a connector. The pair of seat mounts and the pair or moveable arms can be arranged to form the position conversion bracket to have a substantially rectangular shape in an intermediate, extended position, in which the pair of moveable arms are disposed substantially parallel with respect to each other on opposite sides of the position conversion bracket, and the pair of seat mounts are disposed substantially parallel with respect to each other on the other opposite sides of the position conversion bracket, in the intermediate, extended position, and in which the position conversion bracket is constructed such that the moveable arms and the seat mounts can rotatably move in a plane with respect to each other. The position conversion brackets can be constructed and disposed such that, upon application of the pulling force to the seat, a distal end of each of the pair of moveable arms moves to define an arcuately-shaped path with respect to a lower one of the pair of seat mounts, so as to effect a single translational movement of an upper one of the pair of seat mounts with respect to the lower seat mount. Each moveable arm can further include an inward bend having an angle which is selected to result in a first height of a seat bottom above a floor to be a same height in the upright position and in the flat position. Each moveable arm can also be constructed to have a length selected to result in a second height of the seat bottom above the floor to be a different and greater height than the first height in the intermediate, extended position between said upright position and said flat position. Each moveable arm can be constructed to have a length selected to result in the seat being spaced apart from a back by a distance, d, in the flat position, in which the upper seat mount is attached to the seat at a location which will cause the seat to be adjacent to the back in the upright position, and the distance, d, is equal to a same length of an upper portion of the back such that the back can be rotatably moved into an adjacent flat position next to the seat in the flat position. Each pair of seat mounts can have a length that results in a portion of a weight of the seat effecting a moving force on the seat so as to use gravity to assist with the movement of the seat from the intermediate, extended position to the flat position, and to assist with the movement of the seat back to the upright position from the intermediate, extended position, so as to reduce the pulling and pushing force required to change the position of the seat from the upright position to the flat position, and vice versa.

In such position change method embodiments, each position conversion bracket can further include a downward-depending support member rotatably connected at one end to an end of a support member via a connector, the support member being connected at another end to an uppermost end of the outermost moveable arm, and to an outermost end of the upper seat mount at one corner of the position conversion bracket. The downward-depending support member can be configured to swing arcuately in a rotation about said connector so as to move between one of a subtantially horizontal orientation in the upright position and a substantially vertical orientation in the flat position, and the downward-depending support member can be balanced or weighted so as to move into a generally or substantially vertical position for supporting the weight of the seat in the flat position.

In addition, various embodiments can comprise a convertible-position sofa including at least two position conversion brackets mounted at opposites sides of a seat of the convertible-position sofa, in which each position conversion bracket includes a pair of seat mounts and a pair of moveable arms each rotatably connected at an end to one of the seat mounts using a connector. In various embodiments, the pair of seat mounts and the pair or moveable arms are arranged to form the position conversion bracket to have a substantially rectangular shape in an intermediate, extended position, in which the pair of moveable arms are disposed substantially parallel with respect to each other on opposite sides of the position conversion bracket, and the pair of seat mounts are disposed substantially parallel with respect to each other on the other opposite sides of the position conversion bracket, in the intermediate, extended position, and in which the position conversion bracket is constructed such that the moveable arms and the seat mounts can rotatably move in a plane with respect to each other. The position conversion brackets can be constructed and disposed such that, upon application of said pulling force to the seat, a distal end of each of the pair of moveable arms moves to define an arcuately-shaped path with respect to a lower one of the pair of seat mounts, so as to effect a single translational movement of an upper one of the pair of seat mounts with respect to the lower seat mount. Each moveable arm can further include an inward bend having an angle which is selected to result in a first height of a seat bottom above a floor to be a same height in the upright position and in the flat position. Each moveable arm can also be constructed to have a length selected to result in a second height of the seat bottom above the floor to be a different and greater height than the first height in the intermediate, extended position between said upright position and said flat position. Each moveable arm can also be constructed to have a length selected to result in the seat being spaced apart from a back by a distance, d, in the flat position, in which the upper seat mount is attached to the seat at a location which will cause the seat to be adjacent to the back in the upright position, and in which the distance, d, is equal to a same length of an upper portion of the back such that the back can be rotatably moved into an adjacent flat position next to the seat in the flat position. Each of the pair of seat mounts can have a length that results in a portion of a weight of the seat effecting a moving force on the seat so as to use gravity to assist with the movement of the seat from the intermediate, extended position to the flat position, and to assist with the movement of the seat back to the upright position from the intermediate, extended position, so as to reduce the pulling and pushing force required to change the position of the seat from the upright position to the flat position, and vice versa. Each position conversion bracket can further include a downward-depending support member rotatably connected at one end to an end of a support member via a connector, the support member being connected at another end to an uppermost end of the outermost moveable arm, and to an outermost end of the upper seat mount at one corner of the position conversion bracket. The downward-depending support member can be configured to swing arcuately in a rotation about said connector so as to move between one of a subtantially horizontal orientation in the upright position and a substantially vertical orientation in the flat position, and the downward-depending support member can be balanced or weighted so as to move into a generally or substantially vertical position for supporting the weight of the seat in the flat position.

BRIEF DESCRIPTION OF THE DRAWINGS

Embodiments will hereinafter be described in detail below with reference to the accompanying drawings, wherein like reference numerals represent like elements.

DETAILED DESCRIPTION

Embodiments relate generally to a convertible-position device and method for changing a position of a convertible-position item of furniture.

Figure 1:
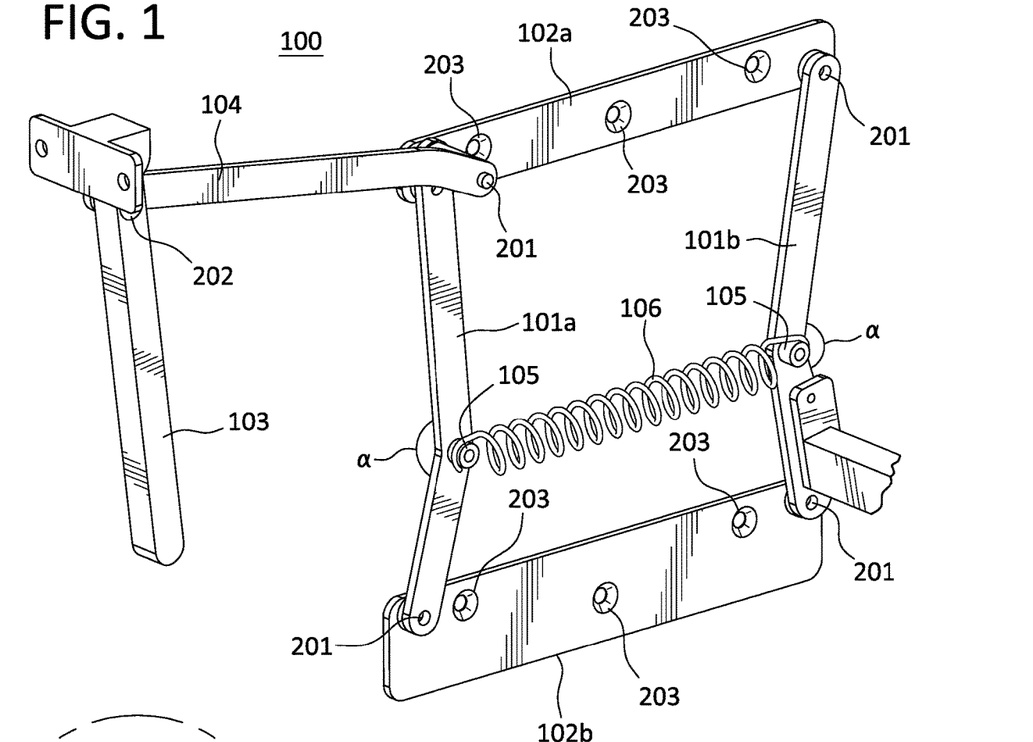
FIG. 1 is an interior side-facing perspective view of a position conversion bracket in accordance with various embodiments.

With respect to FIG. 1, there is shown a position conversion bracket 100 according to various embodiments. Referring now to FIG. 1, the position conversion bracket 100 can comprise a pair of moveable arms 101a, 101b, and a pair of seat mounts 102a, 102b arranged to form the position conversion bracket 100 to have a substantially rectangular shape in a highest extended position (see FIG. 3C). In at least one embodiment, the position conversion bracket 100 can have a square shape in the highest extended position. The pair of moveable arms 101a and 101b are disposed generally or substantially parallel with respect to each other on opposite sides of the position conversion bracket 100, and the pair of seat mounts 102a and 102b are disposed generally or substantially parallel with respect to each other on the other opposite sides of the position conversion bracket 100, in the highest extended position (see FIG. 3C). Each moveable arm 101a, 101b can be rotatably connected at an end to one of said seat mounts 102a, 102b using a connector 201 which can be a pin, rod, bolt, or screw, or the like, for permitting the moveable arms 101a, 101b and seat mounts 102a, 102b to rotatably move in a plane with respect to each other. In at least one embodiment, each moveable arm 101a, 101b and each seat mount 102a, 102b are each rotatably connected at their respective ends to thus form the generally or substantially rectangular position conversion bracket 100. However, other connection locations are possible.

In various embodiments, the position conversion bracket 100 can comprise a downward-depending support member 103 which is rotatably connected at one end to an end of a support member 104 via a connector 202. The support member 104 is connected at its other end to an uppermost end of the outermost moveable arm 101a and to an outermost end of the upper seat mount 102a, at one corner of the position conversion bracket 100 via one of said connectors 201.

In various embodiments, the outermost moveable arm 101a can have a slight inward bend 105 in a direction of the oppositely-disposed innermost moveable arm 101b, and the innermost moveable arm 101b can have a corresponding slight inward bend 105 in a direction of the oppositely-disposed outermost moveable arm 101a. In some embodiments, the bracket 100 can further comprise a biasing member 106, such as, for example, a spring, that connects the moveable arms 101a and 101b between their inward bend 105 points. Each seat mount 102a, 102b can further comprise a plurality of mounting holes 203 for attachment to a seat 301 (see, e.g., FIGS. 3A to 3E).

Figure 3A:
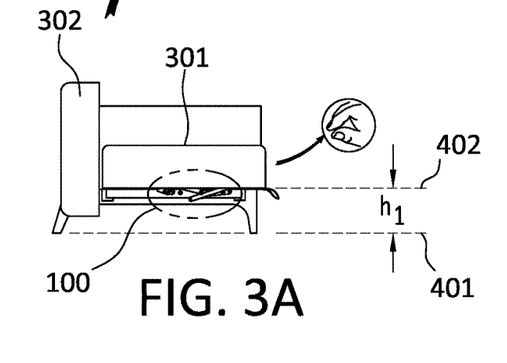
FIGS. 3A to 3E illustrate a method of operation of the position conversion assembly and bracket in accordance with various embodiments.
Figure 3B:
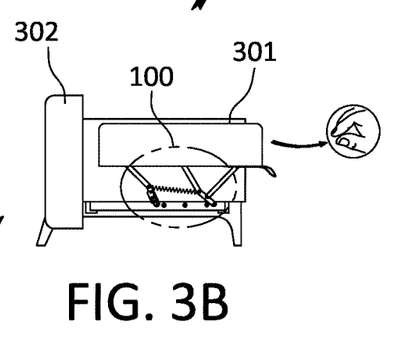
Figure 3C:
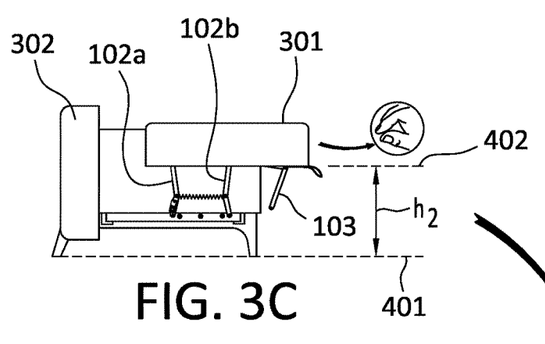
Figure 3D:
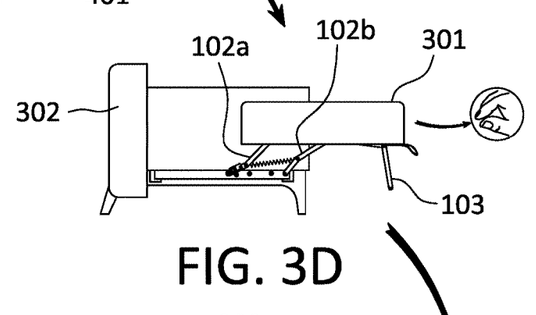
Figure 3E:
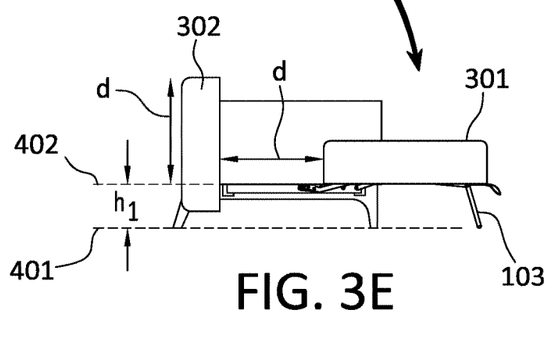
Figure 4A:
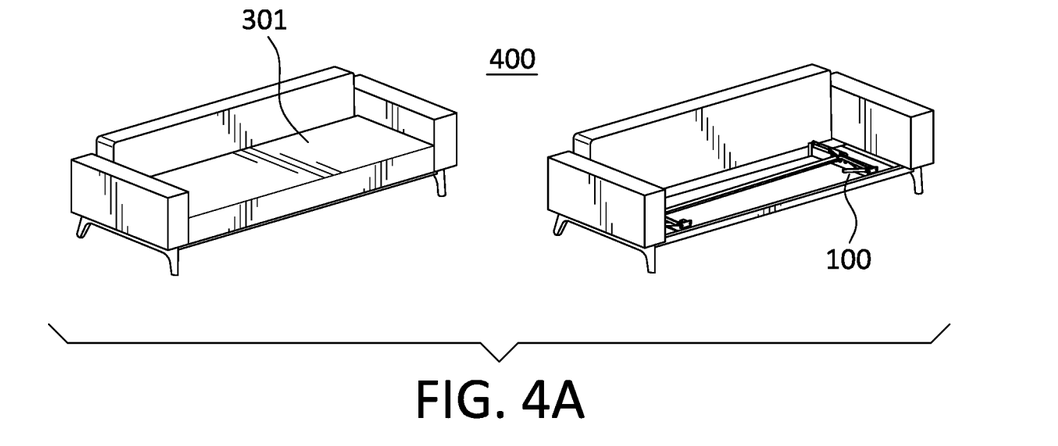
FIGS. 4A to 4E illustrate operation of a convertible-position sofa including the position conversion assembly and bracket in accordance with various embodiments, in correspondence with each of FIGS. 3A to 3E, respectively.
Figure 4B:
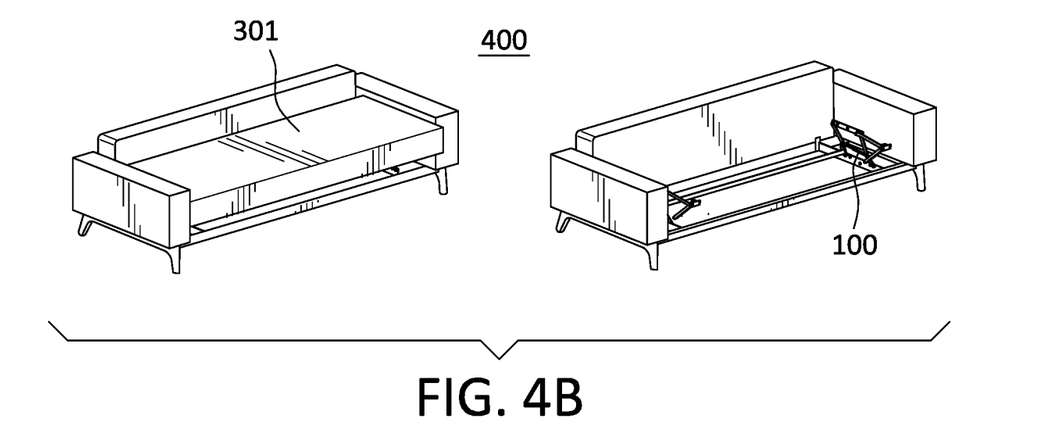
Figure 4C:
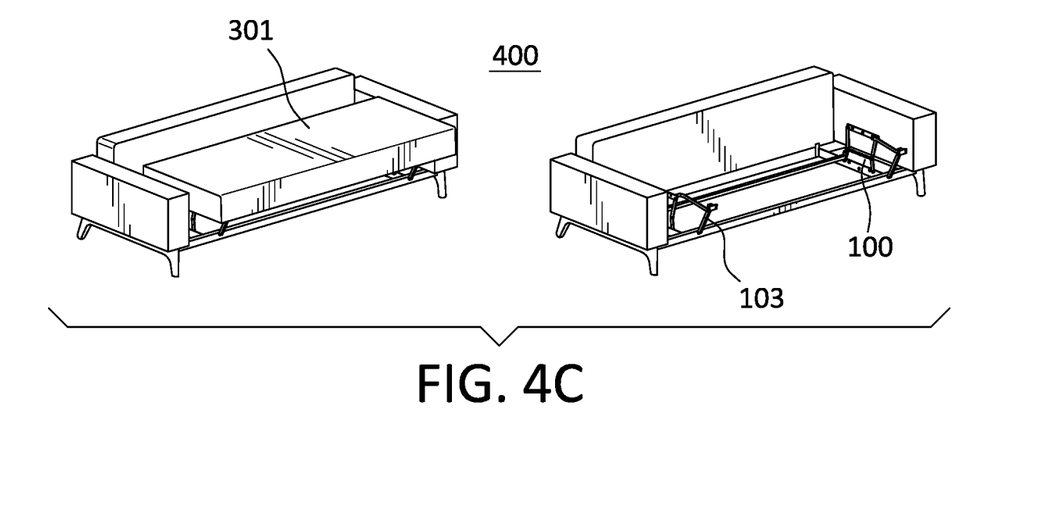
Figure 4D:
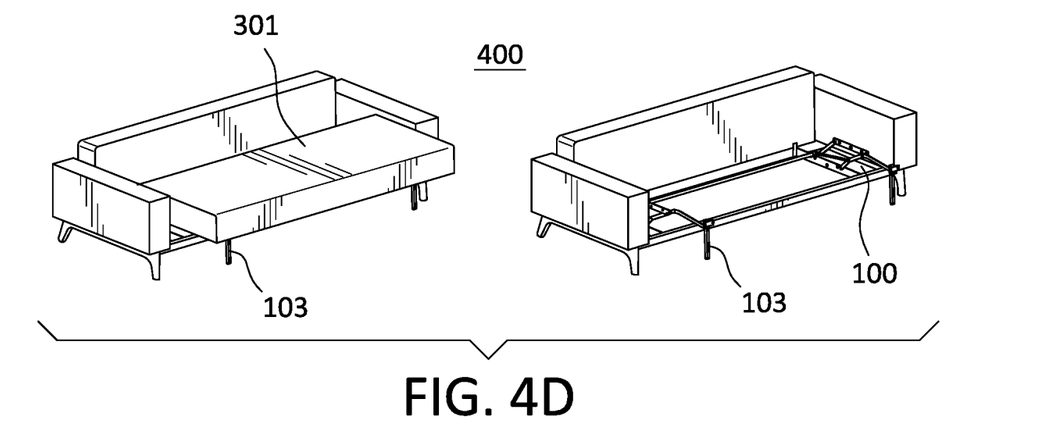
Figure 4E:
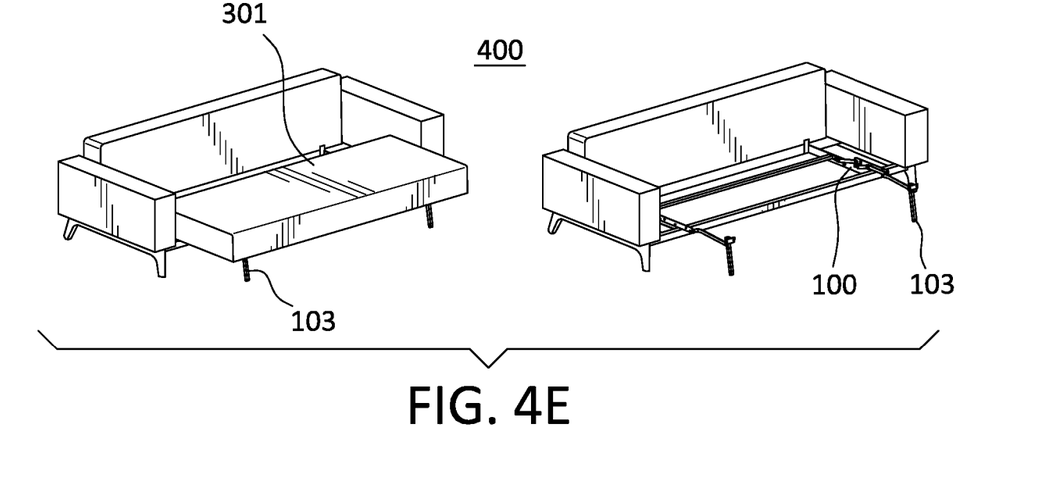

Downward-depending support member or leg 103 swings arcuately in a rotation about said connector 202 so as to move into a position which provides vertical support to a seat (see FIG. 4E) in a second or flat position (see FIG. 3E). In at least one embodiment, the leg 103 is balanced, or weighted, such as, for example, weight being distributed at or near a distal end of the leg 103, so as to move between one of a generally or substantially horizontal position and a generally or substantially vertical position for supporting the weight of a seat in a flat position (see, e.g., FIGS. 3A to 3E and 4A to 4E) due to a directional force imparted by the direction of movement of the seat acting in concert with force of gravity.

Figure 2:
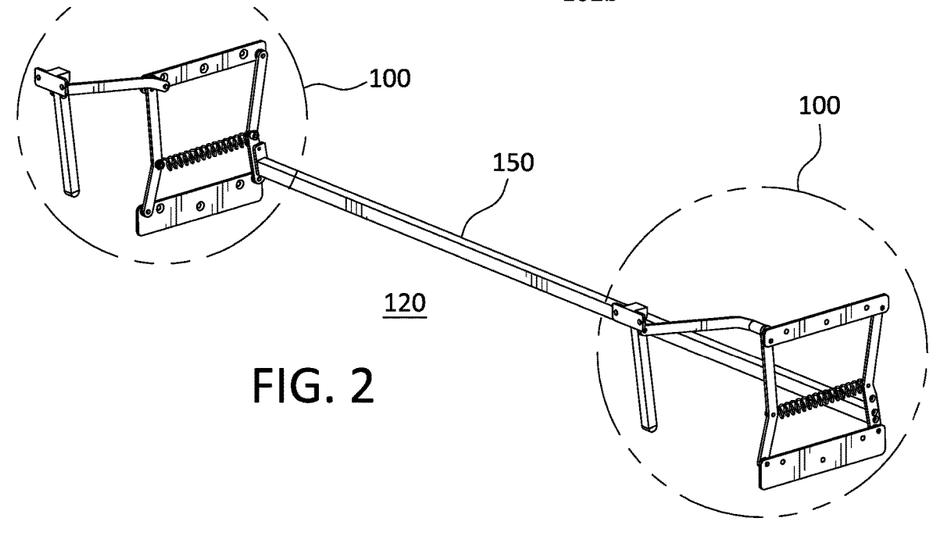
FIG. 2 is a front perspective view of a position conversion assembly in accordance with various embodiments.

With respect to FIG. 2, there is shown a position conversion assembly 120 comprising a plurality of position conversion brackets 100 connected via a rigid connector support 150. The connector support 150 can be fixedly connected at each end to a lower end of the innermost moveable arm 101b and rotatably connected at said end to an innermost end of the lower seat mount 102b, at one corner of the position conversion bracket 100 via one of said connectors 201. The connector support 150 can have a length constructed so as to position each of two conversion brackets 100 at opposite sides of a seat 301.

In various embodiments, the above-described bracket 100 and assembly 120 can be made of steel. However, any rigid material may be used to implement the bracket 100 and assembly 120 and their components.

With respect to FIGS. 3A to 3E, there is shown a method of operation for the position conversion assembly and bracket according to various embodiments. Referring now to FIGS. 3A to 3E, a user may operate the position conversion assembly by exerting a light pulling force in a generally or substantially outward and upward direction. In various embodiments, the position conversion bracket is constructed so that during operation, the movement of the distal or upper ends of the moveable arms 101a and 101b define an arcuately-shaped path with respect to the lower seat mount 102b, thus effecting a single translational movement of the upper seat mount 102a with respect to the lower seat mount 102b from a first, upright position (see FIG. 3A) to a second, flat position (see FIG. 3E), and vice versa, through intermediate positions as shown in FIGS. 3B to 3D.

With respect to FIGS. 4A to 4E, there is shown an operation of a convertible-position sofa which includes the position conversion assembly 120 and bracket 100 in accordance with various embodiments. Each position shown in each of FIGS. 4A to 4E corresponds, respectively, with a corresponding position shown in each of FIGS. 3A to 3E.

Returning to FIGS. 3A to 3E, it is shown that the inward bends 105 of the moveable arms 101a and 101b are each constructed to have an angle, a, which will result in a height, $h_1$, of a seat bottom height 402 above a floor 401 (or resting plane for the article of furniture or sofa) to be the same height $h_1$ when the sofa is in the first or upright position (see FIG. 3A) and when the sofa is in the second or flat position (see FIG. 3E). Furthermore, the moveable arms 101a and 101b are each constructed to have an overall length which will result in a height, $h_2$, of the seat bottom height 402 above a floor 401 to be a different and greater height than the height $h_1$ when the sofa is in an intermediate, extended position (see FIG. 3C). The length of the moveable arms 101a and 101b is also selected to result in the seat 301 being spaced apart from a back 302 by a distance, d, when the sofa is in the second or flat position (see FIG. 3E). In various embodiments, the upper seat mount 102a is attached to the seat 301 at a location which will cause the seat 301 to be adjacent to the back 302 when the sofa is in the first or upright position (see FIG. 3A). The lower seat mount 102b is attached to a frame at a corresponding location with respect to the attachment location of the upper seat mount 102a to the seat 301. In various embodiments, the distance, d, may be equal to a same length of an upper portion of the back 302 such that the back 302 can be rotatably moved into an adjacent flat position next to the seat 301 (not shown) when the sofa is in the second or flat position.

In various embodiments, a length of each of the seat mounts 102a and 102b (as well as the location of the attachment points thereon of the moveable arms 101a and 101b) is a predetermined length that results in a portion of the weight of the seat 301 effecting a moving force on the seat 301 so as to use gravity to assist with the movement of the seat 301 from the intermediate, extended position (see FIG. 3C) to the second, flat position (see FIG. 3E) via an intermediate position (see FIG. 3D), as well as with the movement of the sofa back to the first, upright position (see FIG. 3A) from the intermediate, extended position (FIG. 3C) via an intermediate position (see FIG. 3B), so as to minimize the lifting or pulling force required to be exerted by the user in changing the position of the item of furniture from an upright to lie-flat position. In various embodiments, the biasing member 106 may provide a smoothing force during movement of the seat 301 from the intermediate, extended position (see FIG. 3C) to the second, flat position (see FIG. 3E) via an intermediate position (see FIG. 3D), as well as during movement of the sofa back to the first, upright position (see FIG. 3A) from the intermediate, extended position (FIG. 3C) via an intermediate position (see FIG. 3B). The smoothing force provided by the biasing member 106 can be provided in opposition to the lifting or pulling force, as well as to the force due to gravity, so as to provide for a smooth arcuate movement of the sofa throughout the positions as shown in FIGS. 3A to 3E and 4A to 4E.

Thus has been shown a single-movement position change apparatus and methods for using the same. While the invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of the invention.

What is claimed is:

1. A position conversion bracket comprising:
   a pair of seat mounts; and
   a pair of moveable arms each rotatably connected at an end to one of said seat mounts using a connector,
   wherein the pair of seat mounts and the pair or moveable arms are arranged to form the position conversion bracket to have a substantially rectangular shape in a highest extended position,
   wherein the pair of moveable arms are disposed substantially parallel with respect to each other on opposite sides of the position conversion bracket, and the pair of seat mounts are disposed substantially parallel with respect to each other on the other opposite sides of the position conversion bracket, in the highest extended position,
   wherein the position conversion bracket is constructed such that the moveable arms and the seat mounts can rotatably move in a plane with respect to each other, and
   wherein an outermost one of said pair of moveable arms has an inward bend in a first direction toward an oppositely-disposed innermost one of said pair moveable arms, and said innermost one of said pair of moveable arms has a corresponding inward bend in a second direction toward said oppositely-disposed outermost moveable arm, said second direction being opposite to said first direction, and a biasing member connects the pair of moveable arms at their inward bends.

2. The position conversion bracket of claim 1, wherein each said moveable arm and each said seat mount is rotatably connected at respective ends to form the substantially rectangular position conversion bracket.

3. The position conversion bracket of claim 2, wherein the position conversion bracket has a square shape in the highest extended position.

4. The position conversion bracket of claim 1, further comprising:
   a downward-depending support member rotatably connected at one end to an end of a support member via a connector, said support member being connected at another end to an uppermost end of the outermost moveable arm and to an outermost end of the upper seat mount at one corner of the position conversion bracket via one of said connectors.

5. The position conversion bracket of claim 4, wherein said downward-depending support member is configured to swing arcuately in a rotation about said connector so as to move between one of a substantially horizontal position and a substantially vertical position.

6. A convertible-position assembly comprising:
   a plurality of position conversion brackets each connected by a rigid connector support,
   wherein each said position conversion bracket comprises a pair of seat mounts; and
   a pair of moveable arms each rotatably connected at an end to one of said seat mounts using a connector,
   wherein the pair of seat mounts and the pair or moveable arms are arranged to form the position conversion bracket to have a substantially rectangular shape in a highest extended position,
   wherein the pair of moveable arms are disposed substantially parallel with respect to each other on opposite sides of the position conversion bracket, and the pair of seat mounts are disposed substantially parallel with respect to each other on the other opposite sides of the position conversion bracket, in the highest extended position, wherein the position conversion bracket is constructed such that the moveable arms and the seat mounts can rotatably move in a plane with respect to each other, wherein each said moveable arm further comprises an inward bend having an angle which is selected to result in a first height of a seat bottom above a floor to be a same height in the upright position and in the flat position, wherein an outer apex of said inward bend of one of said pair of moveable arms extends in a direction toward an outer apex of an oppositely-disposed second of said pair of moveable arms, and wherein a biasing member connects the pair of moveable arms at their inward bends.

7. The convertible-position assembly of claim 6, wherein the rigid connector support has a length constructed so as to position each said position conversion bracket at opposite sides of an attached seat.

8. The convertible-position assembly of claim 7,
wherein said position conversion assembly is constructed such that, upon application of a pulling force to said attached seat, a distal end of each of said pair of moveable arms moves to define an arcuately-shaped path with respect to a lower one of said pair of seat mounts, so as to effect a single translational movement of an upper one of said pair of seat mounts with respect to the lower seat mount.

9. The convertible-position assembly of claim 8,
wherein, upon said application of said pulling force, said position conversion assembly is constructed to move said attached seat from an upright position to a flat position, and wherein, upon application of a pushing force in a direction opposite said pulling force, said position conversion assembly is constructed to move said attached seat from said flat position to said upright position.

10. The convertible-position assembly of claim 9,
wherein each said moveable arm is constructed to have a length selected to result in the seat being spaced apart from a back by a distance, d, in the flat position, wherein the upper seat mount is attached to the seat at a location which will cause the seat to be adjacent to the back in the upright position, and wherein the distance, d, is equal to a same length of an upper portion of the back such that the back can be rotatably moved into an adjacent flat position next to the seat in the flat position.

11. The convertible-position assembly of claim 9,
wherein each of said pair of seat mounts has a length that results in a portion of a weight of the seat effecting a moving force on the seat so as to use gravity to assist with the movement of the seat from the intermediate, extended position to the flat position, and to assist with the movement of the seat back to the upright position from the highest extended position, so as to reduce the pulling and pushing force required to change the position of the seat from the upright position to the flat position, and vice versa.

12. The convertible-position assembly of claim 9, wherein each said position conversion bracket further comprises:
a downward-depending support member rotatably connected at one end to an end of a support member via a connector, said support member being connected at another end to an uppermost end of said outermost moveable arm, and to an outermost end of the upper seat mount at one corner of the position conversion bracket, wherein said downward-depending support member is configured to swing arcuately in a rotation about said connector so as to move between one of a subtantially horizontal orientation in the upright position and a substantially vertical orientation in the flat position, and wherein the downward-depending support member is balanced or weighted so as to move into a generally or substantially vertical position for supporting the weight of the seat in the flat position.

13. The convertible-position assembly of claim 6, wherein said rigid connector support is fixedly connected at each end to a lower end of an innermost one of said pair of moveable arms, and rotatably connected to an innermost end of a lower one of said seat mounts, at one corner of the position conversion bracket.

14. The convertible-position assembly of claim 6,
wherein each said moveable arm is constructed to have a length selected to result in a second height of the seat bottom above the floor to be a different and greater height than the first height in an intermediate, extended position between said upright position and said flat position.

15. A position change method comprising:
providing at least two position conversion brackets mounted at opposite sides of a seat of a convertible-position furniture item;

applying a pulling force to said seat to change a position of said seat from an upright position to a flat position; and applying a pushing force in a direction opposite said pulling force to change a position of said seat from said flat position to said upright position, wherein each said position conversion bracket comprises a pair of seat mounts; and
a pair of moveable arms each rotatably connected at an end to one of said seat mounts using a connector, wherein the pair of seat mounts and the pair or moveable arms are arranged to form the position conversion bracket to have a substantially rectangular shape in an intermediate, extended position, wherein the pair of moveable arms are disposed substantially parallel with respect to each other on opposite sides of the position conversion bracket, and the pair of seat mounts are disposed substantially parallel with respect to each other on the other opposite sides of the position conversion bracket, in the intermediate, extended position, wherein the position conversion bracket is constructed such that the moveable arms and the seat mounts can rotatably move in a plane with respect to each other, wherein each said moveable arm further comprises an inward bend having an angle which is selected to result in a first height of a seat bottom above a floor to be a same height in the upright position and in the flat position, and wherein an outer apex of said inward bend of one of said pair of moveable arms extends in a direction toward an outer apex of an oppositely-disposed second of said pair of moveable arms, and wherein a biasing member connects the pair of moveable arms at their inward bends.

16. The position change method of claim 15,
wherein said position conversion brackets are constructed and disposed such that, upon application of said pulling force to said seat, a distal end of each of said pair of moveable arms moves to define an arcuately-shaped path with respect to a lower one of said pair of seat mounts, so as to effect a single translational movement of an upper one of said pair of seat mounts with respect to the lower seat mount.

17. The position change method of claim 15,
wherein each said moveable arm is constructed to have a length selected to result in a second height of the seat bottom above the floor to be a different and greater height than the first height in the intermediate, extended position between said upright position and said flat position.

18. The position change method of claim 15,
wherein each said moveable arm is constructed to have a length selected to result in the seat being spaced apart from a back by a distance, d, in the flat position,
wherein the upper seat mount is attached to the seat at a location which will cause the seat to be adjacent to the back in the upright position, and
wherein the distance, d, is equal to a same length of an upper portion of the back such that the back can be rotatably moved into an adjacent flat position next to the seat in the flat position.

19. The position change method of claim 15,
wherein each of said pair of seat mounts has a length that results in a portion of a weight of the seat effecting a moving force on the seat so as to use gravity to assist with movement of the seat from the intermediate, extended position to the flat position, and to assist with the movement of the seat back to the upright position from the intermediate, extended position, so as to reduce the pulling and pushing force required to change the position of the seat from the upright position to the flat position, and vice versa.

20. The position change method of claim 15, wherein each said position conversion bracket further comprises:
a downward-depending support member rotatably connected at one end to an end of a support member via a connector, said support member being connected at another end to an uppermost end of said outermost moveable arm, and to an outermost end of the upper seat mount at one corner of the position conversion bracket,
wherein said downward-depending support member is configured to swing arcuately in a rotation about said connector so as to move between one of a substantially horizontal orientation in the upright position and a substantially vertical orientation in the flat position, and
wherein the downward-depending support member is balanced or weighted so as to move into a generally or substantially vertical position for supporting the weight of the seat in the flat position.

21. A convertible-position sofa comprising:
at least two position conversion brackets mounted at opposites sides of a seat of said convertible-position sofa,
wherein each said position conversion bracket comprises a pair of seat mounts; and
a pair of moveable arms each rotatably connected at an end to one of said seat mounts using a connector,
wherein the pair of seat mounts and the pair or moveable arms are arranged to form the position conversion bracket to have a substantially rectangular shape in an intermediate, extended position,
wherein the pair of moveable arms are disposed substantially parallel with respect to each other on opposite sides of the position conversion bracket, and the pair of seat mounts are disposed substantially parallel with respect to each other on the other opposite sides of the position conversion bracket, in the intermediate, extended position, and
wherein the position conversion bracket is constructed such that the moveable arms and the seat mounts can rotatably move in a plane with respect to each other,
wherein each said moveable arm further comprises an inward bend having an angle which is selected to result in a first height of a seat bottom above a floor to be a same height in an upright position and in a flat position, and
wherein an outer apex of said inward bend of one of said pair of moveable arms extends in a direction toward an outer apex of an oppositely-disposed second of said pair of moveable arms, and
wherein a biasing member connects the pair of moveable arms at their inward bends.

22. The convertible-position sofa of claim 21,
wherein said position conversion brackets are constructed and disposed such that, upon application of a pulling force to said seat, a distal end of each of said pair of moveable arms moves to define an arcuately-shaped path with respect to a lower one of said pair of seat mounts, so as to effect a single translational movement of an upper one of said pair of seat mounts with respect to the lower seat mount.

23. The convertible-position sofa of claim 21,
wherein each said moveable arm is constructed to have a length selected to result in a second height of the seat bottom above the floor to be a different and greater height than the first height in the intermediate, extended position between said upright position and said flat position.

24. The convertible-position sofa of claim 21,
wherein each said moveable arm is constructed to have a length selected to result in the seat being spaced apart from a back by a distance, d, in the flat position,
wherein the upper seat mount is attached to the seat at a location which will cause the seat to be adjacent to the back in the upright position, and
wherein the distance, d, is equal to a same length of an upper portion of the back such that the back can be rotatably moved into an adjacent flat position next to the seat in the flat position.

25. The convertible-position sofa of claim 21,
wherein each of said pair of seat mounts has a length that results in a portion of a weight of the seat effecting a moving force on the seat so as to use gravity to assist with the movement of the seat from the intermediate, extended position to the flat position, and to assist with the movement of the seat back to the upright position from the intermediate, extended position, so as to reduce the pulling and pushing force required to change the position of the seat from the upright position to the flat position, and vice versa.

26. The convertible-position sofa of claim 21, wherein each said position conversion bracket further comprises:
a downward-depending support member rotatably connected at one end to an end of a support member via a connector, said support member being connected at another end to an uppermost end of said outermost moveable arm, and to an outermost end of the upper seat mount at one corner of the position conversion bracket, wherein said downward-depending support member is configured to swing arcuately in a rotation about said connector so as to move between one of a substantially horizontal orientation in the upright position and a substantially vertical orientation in the flat position, and wherein the downward-depending support member is balanced or weighted so as to move into a generally or substantially vertical position for supporting the weight of the seat in the flat position.

* * * * *